June 20, 1950   F. D. SNYDER   2,511,881
TUBE CONTROLLED RELAY SYSTEM
Filed Jan. 15, 1946
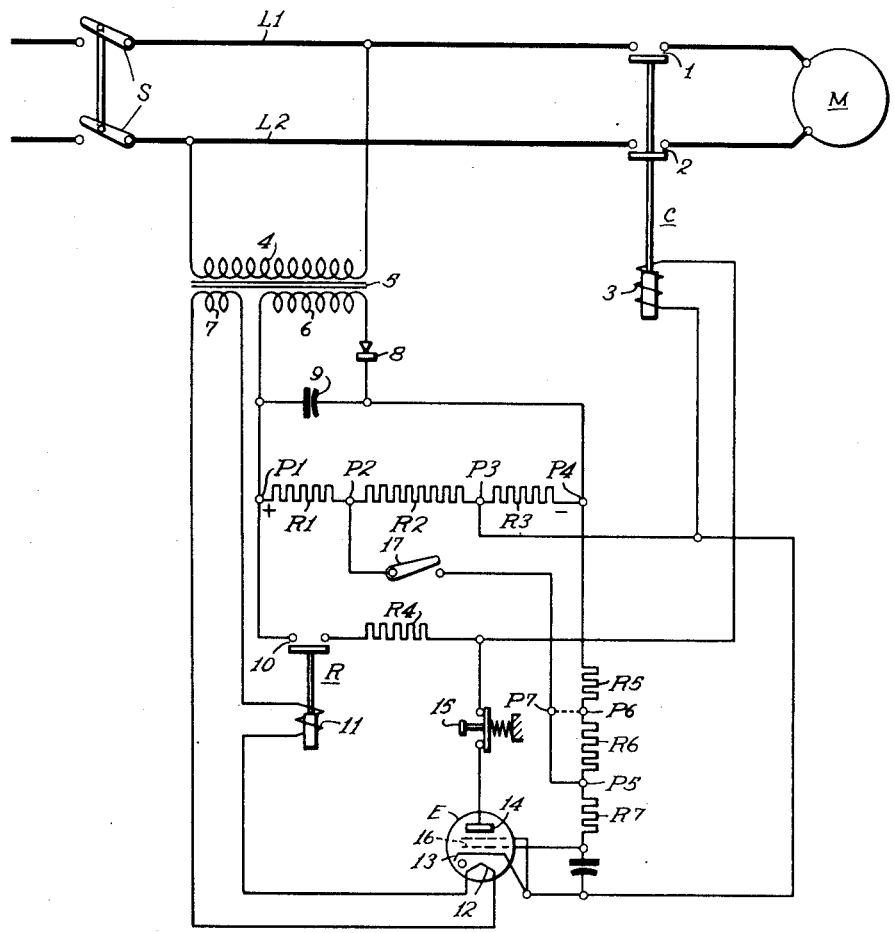
WITNESSES:
Edward Michaels
Wm. C. Groome
INVENTOR
Frederick D. Snyder.
BY
Paul E. Friedemann
ATTORNEY Patented June 20, 1950

2,511,881

UNITED STATES PATENT OFFICE 2,511,881

TUBE CONTROLLED RELAY SYSTEM

Frederick D. Snyder, Milton, Mass., assignor to Westinghouse Electric Corporation, East Pittsburgh, Pa., a corporation of Pennsylvania Application January 15, 1946, Serial No. 641,329

7 Claims. (Cl. 175—320)

My invention relates to relay systems for controlling the operation of electric apparatus or machinery and aims at providing a relay system that responds reliably to control impulses of minute intensity or very short duration while nevertheless affording an optimum degree of foolproofness and protection from operating under improper conditions of the appertaining circuits and circuit devices.

In warpers, knitting machines or other textile fabricating equipment, for instance, it is desired that the break of any one of a large number of threads will cause the machinery to stop until the fault is remedied. To this end a correspondingly large number of feeler devices, such as drop wire contacts or photoelectric elements, are used, each of which controls a separate electronic tube for causing the line contactor of the machine drive to stop the drive motor. It will be understood that each of the many feeler, tube, and relay devices must be maintained in proper operative condition to secure a proper protective performance.

Referring to electronic relay circuits of such or similar type, it is a more specific object of my invention to provide a relay system that, aside from its high sensitivity of normal control operation, will not permit an operation of the controlled machinery or apparatus unless the appertaining electronic tube is properly seated in its socket, properly supplied with plate voltage and cathode-heating current, and unless all other appertaining circuits and circuit devices are in operative condition. In other words, the invention is to provide a relay system that is as nearly foolproof as possible and requires a minimum amount of supervision and maintenance, this advantage being of particular value in cases where a large number of such relay systems are to be used in coordination to one another as in the above-mentioned example of multi-thread textile machinery.

It is also an object of my invention to achieve these advantages by means of simple and relatively inexpensive devices of minimum space consumption.

The invention will be understood from the following description of the embodiment exemplified by the drawing which shows the circuit diagram of a protective relay system for stopping an electric drive motor under control by a feeler or drop wire contact. The numerical voltage, resistance and capacitance values mentioned in the following description are given by way of example and may be modified depending upon the requirements or desiderata of particular applications.

According to the drawing, the drive motor M, for instance, of a textile machine is connected by leads L1 and L2 to a main switch S under control by contacts 1 and 2 of a contactor C whose control coil is denoted by 3. Attached to leads L1 and L2 is the primary winding 4 of a transformer 5 with two secondary windings 6 and 7. The secondary winding 6 providing, for instance, a voltage of 130 volts is connected to a voltage divider composed of three series connected resistors R1 (25,000 ohms), R2 (3,000 ohms) and R3 (250 ohms). A rectifying unit 8 is series connected with the voltage divider. A capacitor 9 (30 microfarads), in parallel to the voltage divider, serves to smooth the rectified current so that a substantially continuous unidirectional current is passed through the voltage divider when the transformer 5 is energized.

The coil 3 of contactor C is connected to the points P1 and P3 of the voltage divider in series with a current limiting resistor R4 (2,500 ohms) and under control by the contact 10 of an electromagnetic relay R whose control coil is denoted by 11. When the control contact 10 is closed, the coil 3 is energized by a unidirectional voltage corresponding to the voltage drop across resistors R1 and R2, and this voltage of, for instance, 115 volts is sufficient to close the contactor C.

An electronic discharge tube E of the gaseous type, for instance a thyratron, has the heater 12 of its cathode 13 connected to the transformer secondary 7 in series with coil 11. Hence, when the main switch S is closed, the heating current of tube E has the effect of closing the relay 10 so that then the control contact 10 will also close and cause the contactor C to pick up, thereby supplying power to the motor.

The anode 14 of tube E is connected through a normally closed contact 15 to the circuit of contactor coil 3, and the tube cathode 13 is connected to the same circuit so that the plate circuit of the tube lies across the contactor coil 3. Hence, when the tube is conductive, the coil 3 is short-circuited so that contactor C drops out in order to stop the motor M. The control grid 16 of tube E is attached to a grid circuit which extends from point P4 of the voltage divider through a group of series connected resistors R5, (10,000 ohms), R6 (10,000 ohms) and R7 (250,000 ohms). This grid circuit includes a by-pass connection which extends from point P2 of the voltage divider through a control device 17 to a point P5 located between resistors R6 and R7.

The control device 17, here simply shown as a switch, may consist of a feeler contact or other fault responsive control device of the machinery driven by the motor M. Since the grid voltage of the tube E, with switch 17 open, is highly negative, the tube E is normally non-conductive so that the closure of switch S, as described above, causes the motor M to operate. However, when due to the break of a thread in the driven machinery or some other fault, the control contact 17 is closed, the grid voltage becomes sufficiently positive, relative to cathode 13, to fire the tube. The tube now short-circuits the coil 3 so that the contactor C drops out and stops the motor. The tube E will continue to be conductive until the system is reset by opening the contact 15.

The control switch 17 need be closed only for a few microseconds to cause firing of the tube. Furthermore, the device is highly sensitive so that the contact made at 17 may include a relatively high contact resistance without preventing proper performance. The illustrated system is designed to have two levels of sensitivity as regards the control switch 17. To this end, a jumper may be connected across the points marked P6 and P7 as indicated by a broken line connection. With the jumper in place, a contact resistance of, for instance, 25,000 ohms or less will fire the tube E. With the jumper removed, a resistance of, for instance, up to 100,000 ohms across switch 17 will suffice to fire the tube.

While a performance of similarly high sensitivity can be obtained with known electronic relay systems, the invention affords in addition the following advantages.

The relay R, whose coil 11 is in series with the tube heater 12, will drop out if the voltage of the heater fails or if the heater filament burns out. When relay R drops out, the contactor C will disconnect the motor so that a positive protection is obtained against improper conditions of the heating circuit.

If the rectifier 8 or the capacitor 9 fail, the voltage effective across the contactor core 3 is no longer unidirectional and continuous, but becomes alternating or intermittent. Since contactor C is rated for continuous operation, such defect will cause the contactor to drop out and stop the machine. If the voltage on the entire system fails, the contactor C will also drop out and thus prevent further operation of the machinery.

If the tube E should work itself out of its socket, the relay R will drop out which in turn will cause the contactor C to interrupt the power supply.

It thus will be recognized that virtually all expectable faults or irregularities that might lead to undesirable machine performance will prevent the motor from driving the machinery. Consequently, if upon closure of the switch S the motor M starts and continues operating, this is an indication of the fact that the protective devices are in satisfactory condition, and that, for instance, in a textile machine the yarn to be fabricated is in good condition.

While I have illustrated a single relay system, it will be understood from the foregoing that any number of such systems may be used to control one and the same main contactor of the drive motor or machinery to be protected. It should also be understood that a relay system for control or protective purposes, as exemplified in the foregoing, is not limited for application to motors but may be used in connection with any other kind of apparatus to be supervised.

It will be obvious to those skilled in the art that control systems according to the invention permit for various modifications and changes without departure from the essence of the invention and within the scope of the essential features of the invention, as set forth in the claims attached hereto.

I claim as my invention:

1. A relay system, comprising an electromagnetic contactor having contact means for controlling an electric circuit and coil means for actuating said contact means, circuit means connected to said coil means for providing energization therefor and including control means for controlling said energization, a gaseous type discharge tube having a plate circuit connected across said coil means for short-circuiting when conductive said coil means and having a discharge control circuit for controlling said plate circuit, said tube having a cathode heating circuit, current responsive means connected with said heating circuit to be responsive to current flowing in said heating circuit and connected to said control means for controlling said control means to permit said coil to be energized only when said heating circuit is in operative condition.

2. A relay system, comprising a contactor having contact means for controlling an electric main circuit and actuating means for closing said contact means, circuit means connected to said actuating means for providing energization therefor, a relay having a contact forming part of said circuit means for controlling said energization and having coil means for controlling said contact, a gaseous discharge tube having a plate circuit connected across said actuating means for short-circuiting when conductive said latter means and having a discharge control circuit for controlling said plate circuit, said tube having a cathode heating circuit series connected with said coil means for energizing the latter when said heating circuit is energized, whereby said contactor is permitted to close said main circuit only when said tube is in operative condition but non-conductive.

3. A relay system, comprising an electromagnetic contactor having a first contact for controlling an electric circuit and a first coil for actuating said first contact, circuit means connected to said first coil for providing energization therefor, an electromagnetic relay having a normally open second contact series-connected with said first coil and having a second coil for causing said second contact to close when said second coil is energized, a gaseous discharge tube having a plate circuit connected across said first coil for short-circuiting when conductive said first coil and having a grid circuit for controlling said plate circuit, said tube having a cathode heating circuit, said second coil being connected with said heating circuit so as to respond to flow of current in said heating current, whereby said first coil is permitted to be energized only when said tube is in operative condition but non-conductive.

4. A relay system, comprising a contact having contact means and a coil for controlling said contact means, a coil circuit connected to said coil to provide energization therefor, control means disposed in said coil circuit for controlling said energization, a gaseous discharge tube having a plate circuit connected with said coil circuit so as to prevent energization of said coil when said plate circuit is in a given condition and having a controllable grid circuit for establishing said condition, said tube having a cathode heating circuit connected with said control means, and said control means being responsive to current in said heating circuit to permit energization of said coil only when said current is flowing.

5. A relay system for controlling apparatus, comprising, a main circuit for operating said apparatus, a contactor having a coil and contacts for connecting said apparatus to said main circuit when said coil is energized; coupling means connected across said main circuit and having a voltage divider composed of three sections series connected with one another so as to have two end points and two intermediate points of respectively different electric potentials, a relay having a relay contact and a relay coil, said relay contact and said contactor coil being series connected to each other between one of said end points and the second following intermediate point, a gaseous discharge tube having a plate circuit connected across said contactor coil for short-circuiting the latter when said tube is conductive, said tube having a grid circuit connected to said other end point to normally prevent said tube from conducting, contact means responsive to the occurrence of a fault in the controlled apparatus and connected between said grid circuit and said remaining intermediate point so as to render said tube conductive when actuated, said tube having a cathode heating circuit, said relay coil being connected in said heating circuit to be energized in response to the flow of current in said heating circuit.

6. A relay system, an alternating-current circuit, a contactor disposed for controlling said circuit and having a direct-current control coil, a control circuit connected to said alternating-current circuit and including rectifier means connected to said coil to provide rectified current for said coil, control means disposed in said control circuit for controlling said rectified current, a gaseous discharge tube having a plate circuit connected across said coil for short-circuiting when conductive said coil and having a controllable grid circuit for controlling said plate circuit, said tube having a cathode heating circuit connected to said alternating-current circuit, current responsive means connected with said heating circuit and associated with said control means for actuating said control means in dependence upon current flowing in said heating circuit, whereby said contactor is permitted to be actuated by said coil only when said rectifier means and said tube are in operative condition and said tube is non-conductive.

7. A relay system, comprising an alternating-current circuit, a contactor disposed for controlling said circuit and having a direct-current control coil, a transformer having a primary circuit connected to said circuit and having secondary terminals, a half-wave rectifier, voltage-dividing impedance means connected to said terminals in series with said rectifier, a capacitor connected across said impedance means so that the latter when in operation are provided with substantially continuous direct current suitable for causing said coil to actuate said contactor when said rectifier and capacitor are in proper condition, a control circuit connecting said coil across part of said impedance means and including means for controlling the energization of said coil, a gaseous discharge tube having a plate circuit connected across said coil for short-circuiting when conductive said coil and having a controllable grid circuit connected to said impedance means for controlling said plate circuit, said tube having a cathode heating circuit, current responsive means connected with said heating circuit to respond to current flowing in said heating circuit and associated with said control means for controlling said control means to permit energizing said coil only when said tube is in operative condition but non-conductive.

FREDERICK D. SNYDER.

REFERENCES CITED

The following references are of record in the file of this patent:

UNITED STATES PATENTS

| Number | Name | Date |
|---|---|---|
| 1,432,006 | Wortman | Oct. 17, 1922 |
| 1,733,045 | Baker | Oct. 22, 1929 |
| 2,171,348 | Schneider | Aug. 29, 1939 |
| 2,221,569 | Berkey | Nov. 12, 1940 |

FOREIGN PATENTS

| Number | Country | Date |
|---|---|---|
| 473,336 | Germany | Mar. 14, 1929 |
| 487,982 | Great Britain | June 29, 1938 |